United States Patent
Lee

(10) Patent No.: US 8,958,045 B2
(45) Date of Patent: *Feb. 17, 2015

(54) LIQUID CRYSTAL DISPLAY DEVICE

(75) Inventor: Dong-Ho Lee, Yongin-si (KR)

(73) Assignee: Samsung Display Co., Ltd. (KR)

( * ) Notice: Subject to any disclaimer, the term of this patent is extended or adjusted under 35 U.S.C. 154(b) by 80 days.

This patent is subject to a terminal disclaimer.

(21) Appl. No.: 13/088,839

(22) Filed: Apr. 18, 2011

(65) Prior Publication Data

US 2011/0194064 A1  Aug. 11, 2011

Related U.S. Application Data

(63) Continuation of application No. 10/412,451, filed on Apr. 11, 2003, now Pat. No. 7,944,539.

(30) Foreign Application Priority Data

Jan. 30, 2003  (KR) .......................... 10-2003-0006189

(51) Int. Cl.
    G02F 1/1345    (2006.01)
    G02F 1/1339    (2006.01)
    G02F 1/1362    (2006.01)

(52) U.S. Cl.
    CPC .......... *G02F 1/13454* (2013.01); *G02F 1/1339* (2013.01); *G02F 1/136227* (2013.01); *G02F 2203/09* (2013.01)
    USPC .......................................... 349/151; 349/149

(58) Field of Classification Search
    USPC ................... 349/41–43, 149–154; 345/92, 98
    See application file for complete search history.

(56) References Cited

U.S. PATENT DOCUMENTS

| | | | |
|---|---|---|---|
| 4,647,156 A | | 3/1987 | Fujimura et al. |
| 5,563,624 A | * | 10/1996 | Imamura ....................... 345/100 |
| 5,811,835 A | | 9/1998 | Seiki et al. |
| 5,896,117 A | | 4/1999 | Moon |
| 6,040,882 A | | 3/2000 | Jun et al. |
| 6,072,556 A | | 6/2000 | Hirakata et al. |
| 6,115,097 A | | 9/2000 | Yamazaki |
| 6,266,116 B1 | | 7/2001 | Ohta et al. |
| 6,320,630 B1 | | 11/2001 | Yamashita et al. |
| 6,346,730 B1 | | 2/2002 | Kitakado et al. |
| 6,355,510 B1 | | 3/2002 | Kim |
| 6,355,942 B1 | | 3/2002 | Yamazaki et al. |

(Continued)

FOREIGN PATENT DOCUMENTS

| | | |
|---|---|---|
| EP | 0444621 A2 | 9/1991 |
| JP | 04-324826 A | 11/1992 |

(Continued)

*Primary Examiner* — Dung Nguyen
(74) *Attorney, Agent, or Firm* — Cantor Colburn LLP

(57) ABSTRACT

An LCD device provides enhanced display quality. An insulating layer is formed on a first substrate. The insulating layer covers the contact portion of a switching device in which the switching device is electrically connected to a transparent electrode and has an opening for exposing a portion of the transparent electrode. A reflection electrode is electrically connected to the transparent electrode through the opening. The insulation layer covers a first portion of a driving circuit formed on the first substrate. A sealant is interposed between the first and second substrate to engage the first and second substrate and to cover a second portion of the driving circuit. Therefore, the driver circuit may operate normally, and the distortion of the signal outputted from the driver circuit may be prevented.

10 Claims, 16 Drawing Sheets

(56) References Cited

U.S. PATENT DOCUMENTS

| | | |
|---|---|---|
| 6,407,430 B1 | 6/2002 | Ohtani et al. |
| 6,466,280 B1 | 10/2002 | Park et al. |
| 6,466,294 B1 | 10/2002 | Yamagishi et al. |
| 6,528,357 B2 * | 3/2003 | Dojo et al. .................... 438/151 |
| 6,587,162 B1 | 7/2003 | Kaneko et al. |
| 6,654,076 B2 | 11/2003 | Ha et al. |
| 6,774,968 B2 | 8/2004 | Hagiwara |
| 6,888,605 B2 | 5/2005 | Yamaguchi |
| 6,922,217 B2 * | 7/2005 | Kim .............................. 349/43 |
| 7,023,518 B1 | 4/2006 | Kayama et al. |
| 7,190,430 B2 | 3/2007 | Miyazaki et al. |
| 7,944,539 B2 * | 5/2011 | Lee ............................... 349/151 |
| 2001/0048501 A1 | 12/2001 | Kim et al. |
| 2001/0048502 A1 | 12/2001 | Moon et al. |
| 2002/0030190 A1 | 3/2002 | Ohtani et al. |
| 2003/0016308 A1 | 1/2003 | Jeon |
| 2011/0051072 A1 * | 3/2011 | Lee ............................... 349/190 |

FOREIGN PATENT DOCUMENTS

| | | |
|---|---|---|
| JP | 08-062635 A | 3/1996 |
| JP | 2505046 | 5/1996 |
| JP | 09-311342 A | 12/1997 |
| JP | 11-305262 A | 5/1999 |
| JP | 11-194367 A | 7/1999 |
| JP | 11-242226 A | 9/1999 |
| JP | 11-326957 A | 11/1999 |
| JP | 2000-305110 A | 11/2000 |
| JP | 2001-125094 | 5/2001 |
| KR | 1019990037027 A | 5/1999 |
| KR | 1020010086702 A | 9/2001 |
| TW | 469484 | 3/2000 |
| TW | 471180 | 1/2002 |
| WO | 02092718 A1 | 11/2002 |

* cited by examiner

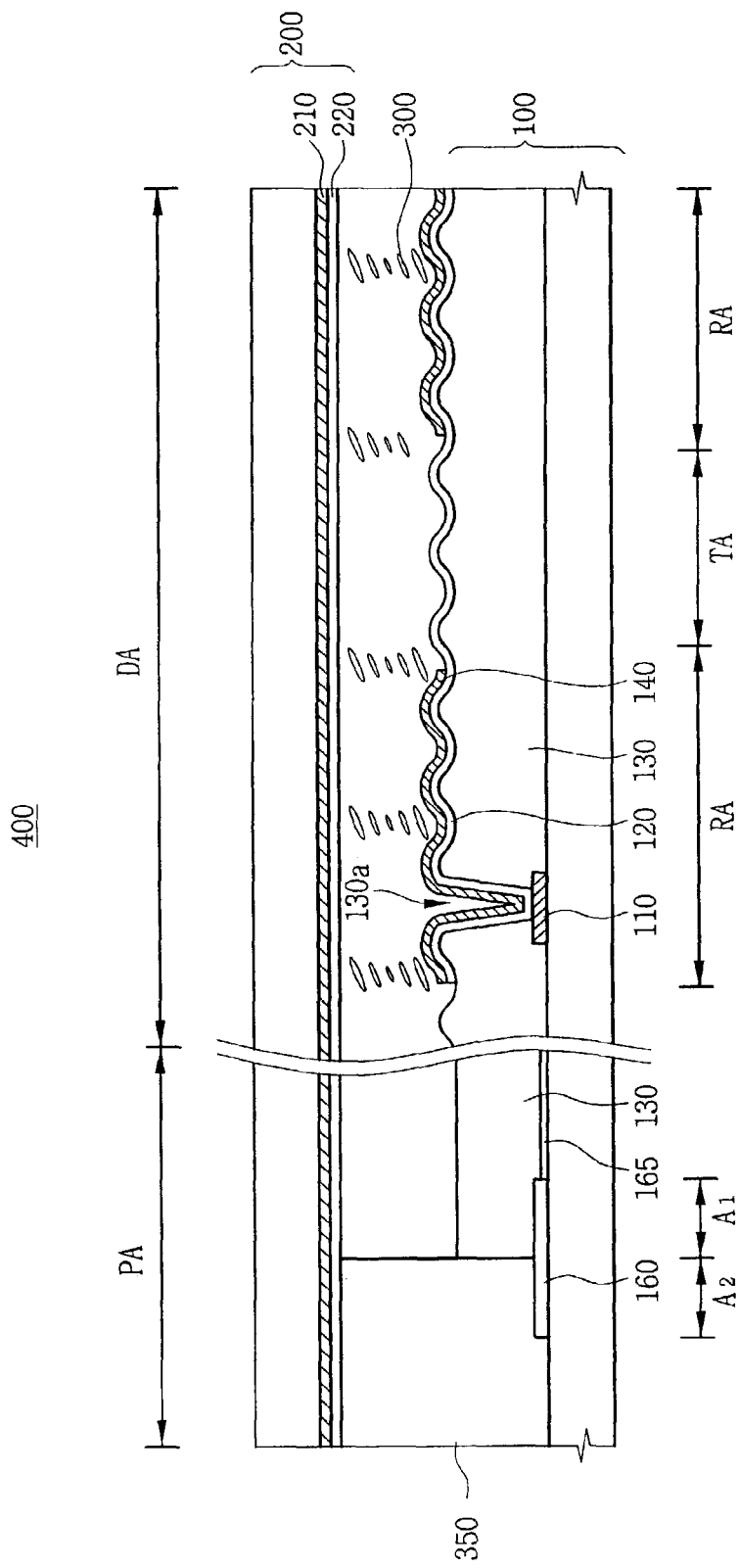

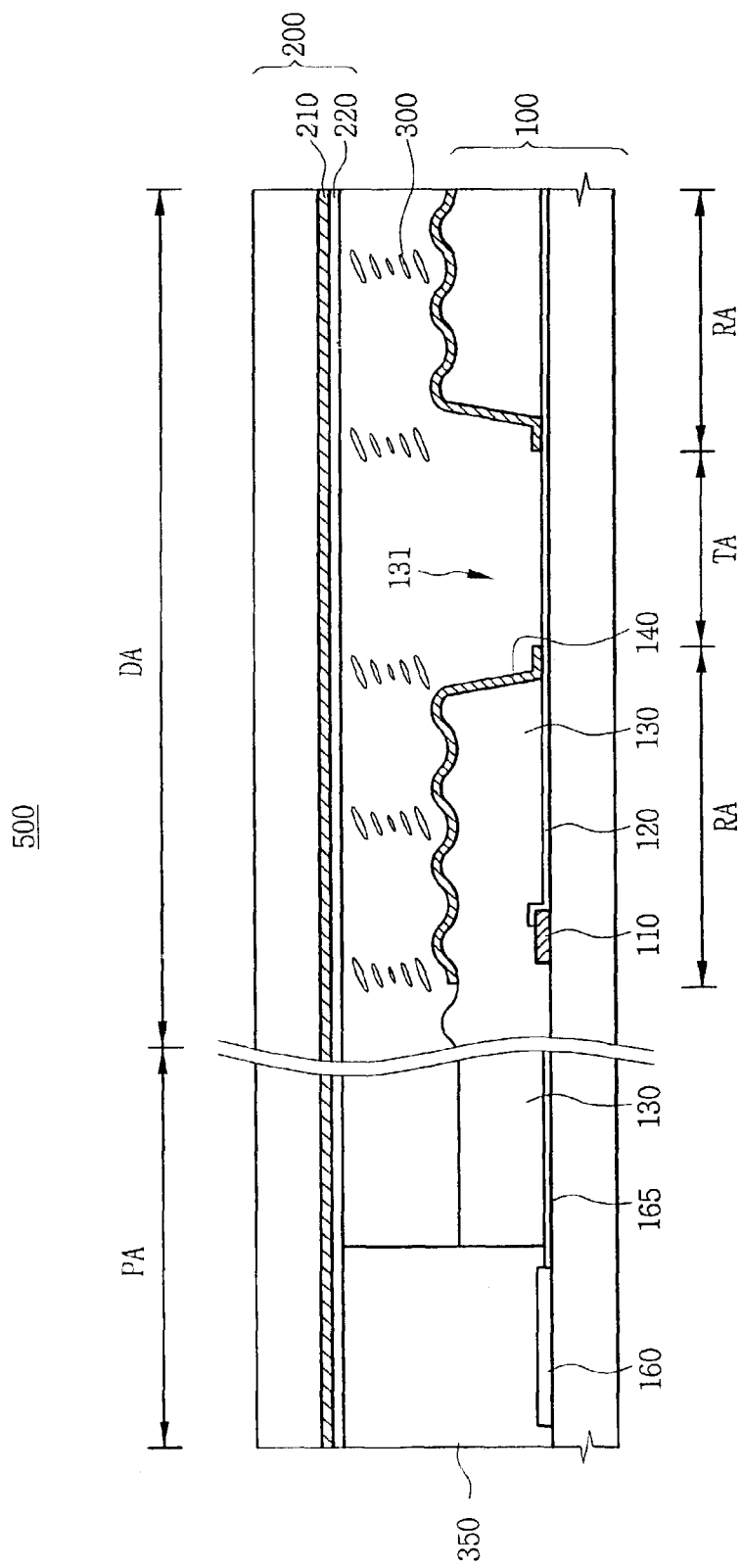

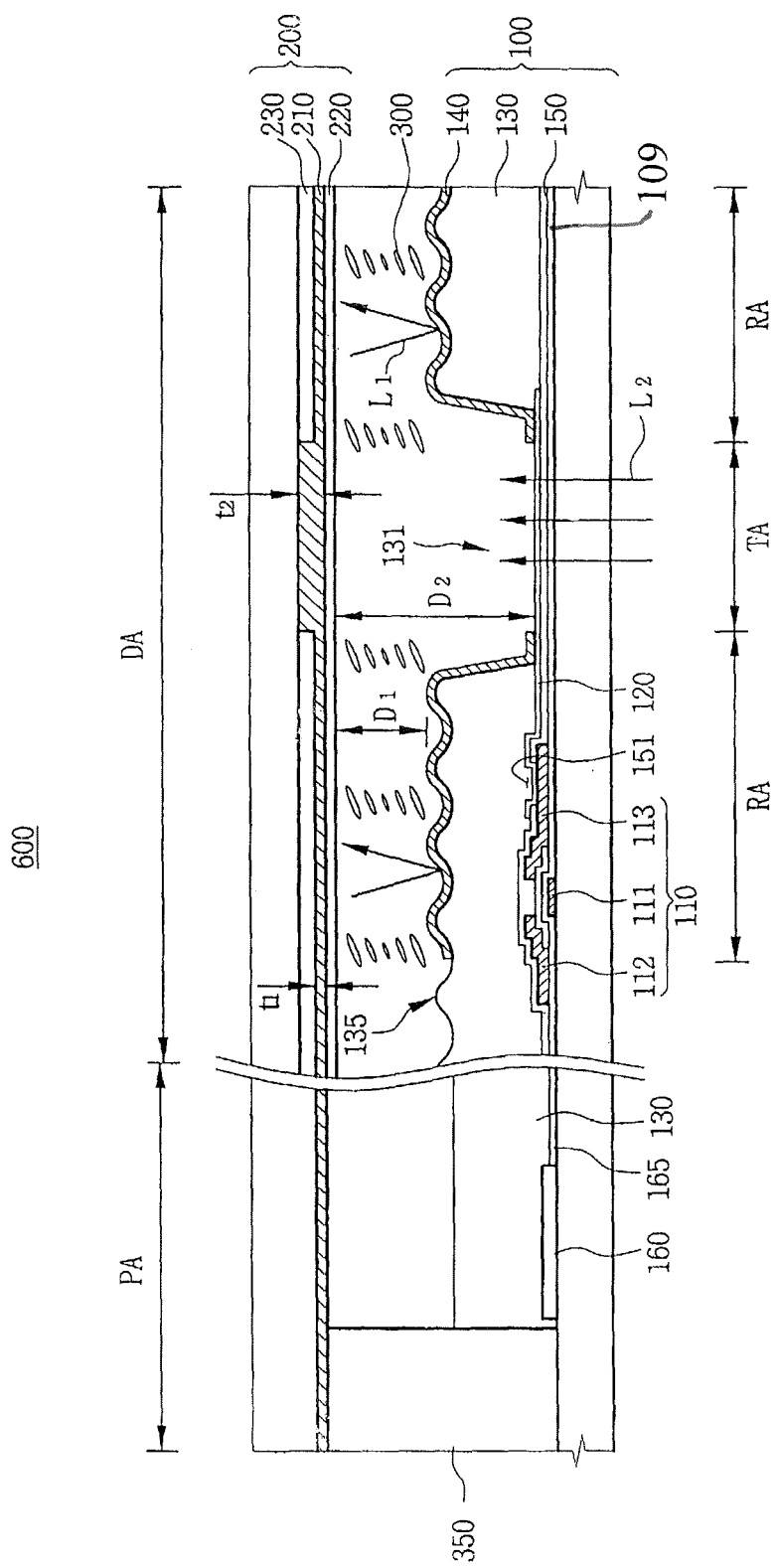

LIQUID CRYSTAL DISPLAY DEVICE

CROSS-REFERENCE TO RELATED APPLICATIONS

This application is a continuation application of U.S. patent application Ser. No. 10/412,451 filed on Apr. 11, 2003, which claims priority to Korean Patent Application No. 2003-0006189 filed on Jan. 30, 2003, the contents of which are herein incorporated by reference in its entirety.

BACKGROUND OF THE INVENTION

1. Field of the Invention

The present invention relates to a liquid crystal display (LCD) device, and more particularly to a liquid crystal display device having an enhanced display quality.

2. Description of the Related Art

An LCD device includes a first substrate, a second substrate and a liquid crystal layer interposed between the first and second substrates. When electric field is formed between the first and second substrates by an external electric signal, the alignment angles of the molecules of the liquid crystal layer are varied by the electric field, so that the LCD device displays an image.

The first substrate includes a display region through which the image is displayed and a peripheral region surrounding the display region. A plurality of pixels is arranged in a matrix shape. Each of the pixels includes a gate line, a data line, a thin film transistor (TFT) and a pixel electrode connected to the TFT.

A gate driver circuit for driving the gate of the TFT is disposed in the peripheral region, and the gate driver circuit may be formed on the first substrate through the process by which the TFT is formed on the first substrate. The gate driver circuit includes a plurality of transistors, capacitors and wirings. An insulation film covers the gate driver circuit. The insulation film has a contact hole. The insulation layer includes a conduction layer that is electrically connected to the TFT through the contact hole. The conduction layer is disposed on the outer surface of the gate driver circuit.

The second substrate includes a common electrode facing the pixel electrode, and the liquid crystal layer is formed between the common electrode and the pixel electrode. Since the common electrode is formed on an entire surface of the second substrate, the common electrode faces the gate driver circuit, and the liquid crystal layer is formed between the common electrode and the gate driver circuit. Accordingly, a parasite capacitance between the conduction layer and the common electrode exists.

The gate driver circuit may not normally operate due to the parasite capacitance. The delay of the signal outputted from the gate driver circuit may happen, and the distortion of the signal outputted from the gate driver circuit may happen. The display quality of the LCD device may be deteriorated due the parasite capacitance.

SUMMARY OF THE INVENTION

Accordingly, it is a feature of the present invention to provide a LCD device having an enhanced display quality.

In one aspect of the present invention, there is provided a liquid crystal display device including a first substrate, a second substrate, a sealing member and a liquid crystal layer. The first substrate includes a display part for displaying an image and a driver part for driving the display unit. The second substrate faces the first substrate. The sealing member is disposed between the first and second substrates to engage the first substrate with the second substrate, and the sealing member covers the driving part. The liquid crystal layer is disposed between the first and second substrates.

In another aspect of the present invention, there is provided a liquid crystal display device including a first substrate, a second substrate and a liquid crystal layer. The first substrate includes a display part for displaying an image and a driver part for driving the display unit. The display part includes a switching device, a transparent electrode, a first insulation and a reflection electrode. The transparent electrode is electrically coupled with the switching device. The first insulation layer is disposed on the transparent electrode to cover a contact portion of the switching device in which the switching device is electrically coupled with the transparent electrode. The first insulation layer has an opening through which a portion of the transparent electrode is exposed. The reflection electrode is disposed on the first insulation layer and is electrically coupled with the transparent electrode at the opening. The second substrate includes a common electrode facing the transparent electrode and the reflection electrode. The second substrate has a first portion and a second portion. The driver part is disposed only under the first portion, the driver part is not disposed under the second portion, and the common electrode is formed on the second portion of the second substrate. The liquid crystal layer is disposed between the first and second substrates.

As described above, according to the liquid crystal display device of this invention, the gate driver circuit formed in the first substrate is covered by the insulation layer and (or sealant) having a dielectric constant lower than that of the liquid crystal layer. In addition, the common electrode disposed over the gate driver circuit is removed.

The parasite capacitance between the gate driver circuit and the common electrode may be reduced. Therefore, the gate driver circuit may operate normally, and the distortion of the signal outputted from the gate driver circuit may be prevented. In addition, the LCD device may provide enhanced display quality.

BRIEF DESCRIPTION OF THE DRAWINGS

The above and other features and advantages of the present invention will become more apparent by describing in detail the preferred embodiments thereof with reference to the accompanying drawings, in which:

FIG. 2A is cross-sectional view showing a transmissive and reflective type liquid crystal display device according to a first exemplary embodiment of the present invention;

FIG. 11A is cross-sectional view showing a transmissive and reflective type liquid crystal display device according to an eighth exemplary embodiment of the present invention;

FIG. 14 is a cross-sectional view showing a liquid crystal display device according to a twelfth exemplary embodiment of the present invention.

DESCRIPTION OF PREFERRED EMBODIMENTS

Hereinafter preferred embodiment of the present invention will be described in detail with reference to the accompanying drawings.

Figure 1:
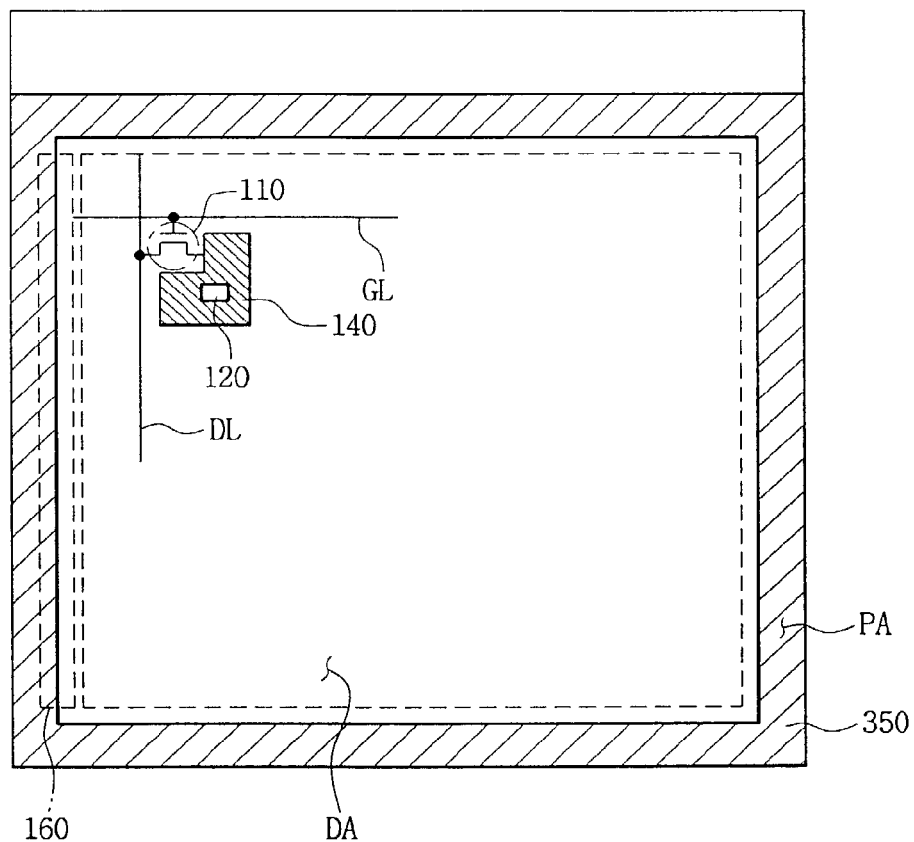
FIG. 1 is a plan view showing an example of a liquid crystal display device of the present invention.
Figure 2B:
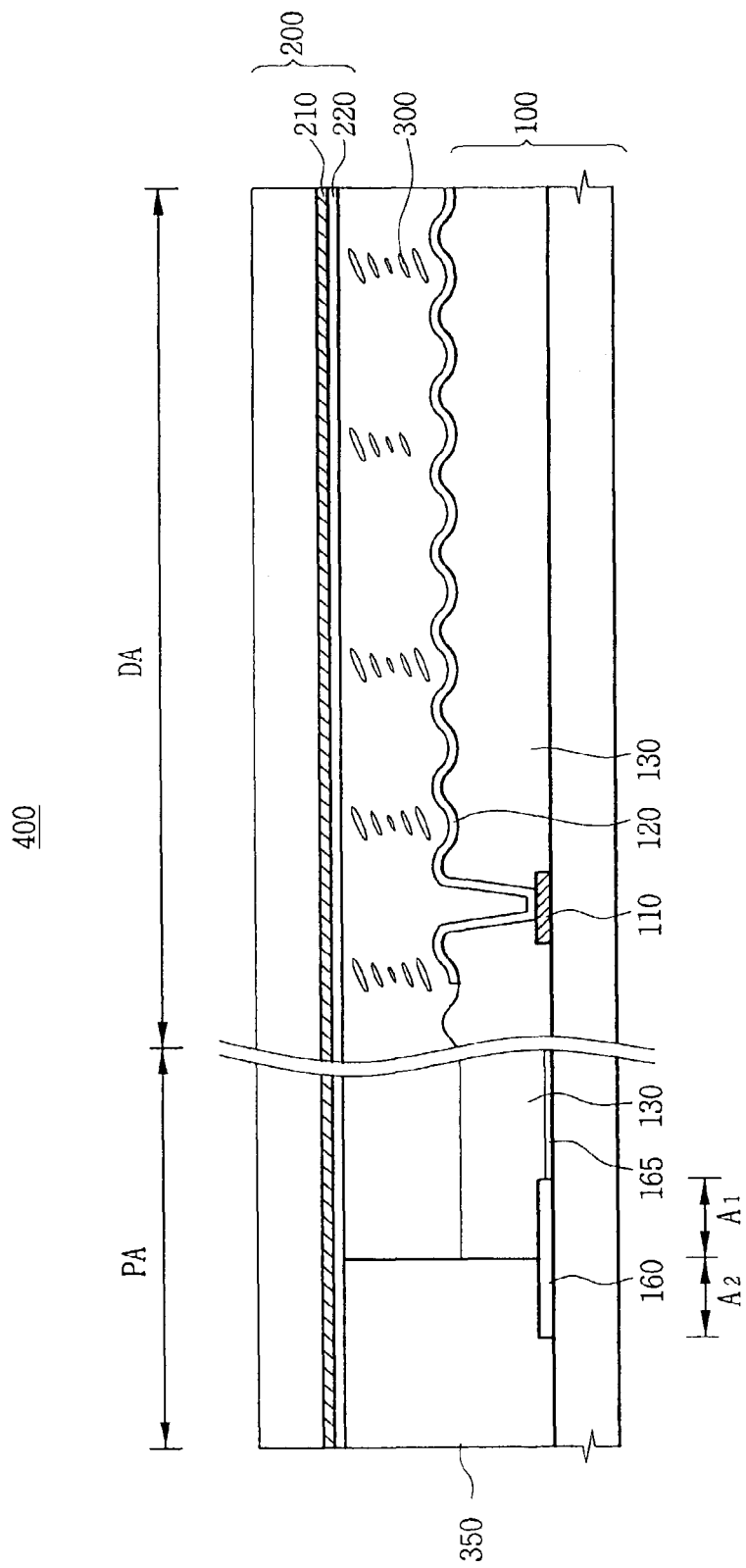
FIG. 2B is cross-sectional view showing a transmissive type liquid crystal display device according to a second exemplary embodiment of the present invention.

FIG. 1 is a plan view showing an example of a liquid crystal display device of the present invention. FIG. 2A is cross-sectional view showing a transmissive and reflective type liquid crystal display device according to a first exemplary embodiment of the present invention, and FIG. 2B is cross-sectional view showing a transmissive type liquid crystal display device according to a second exemplary embodiment of the present invention.

Referring to FIGS. 1 and 2A, the liquid crystal display device according to a first exemplary embodiment of the present invention includes a first substrate 100, a second substrate 200 facing the first substrate 100 and a liquid crystal layer 300 interposed between the first and second substrate 100 and 200.

The first substrate 100 includes a display area (DA) through which an image is displayed and a peripheral area (PA) surrounding the display area (DA). The display area (DA) includes a plurality of pixels arranged in a matrix shape. Each of the pixels includes a thin film transistor (TFT) 110 and a pixel electrode connected to the TFT 110. The TFT 110 is connected to a gate line (GL) and a data line (DL). The data line (DL) is extended in a first direction, and the gate line (GL) is extended in a second direction substantially perpendicular to the first direction. The pixel electrode includes a transparent electrode 120 and a reflection electrode 140.

As shown in FIG. 2A, the display area (DA) is divided into a reflective area (RA) and a transmissive area (TA). The reflection electrode 140 is formed in the reflective area (RA), and the first light generated from an external light source is reflected by the reflection electrode 140 in the reflective area (RA). The transparent electrode 120 is formed in the transmissive area (TA), and the second light generated from an internal light source of the LCD device is passed through the transparent electrode 120 in the transmissive area (TA).

The TFT 110 is formed on the first substrate 100, an organic insulation layer 130 having an embossing pattern is deposited on the first substrate 100 on which the TFT 110 is formed. The organic insulation layer 130 includes a contact hole 130a through which a drain of the TFT 110 is exposed.

The transparent electrode 120 is deposited on the organic insulation layer 130. The transparent electrode 120 comprises indium tin oxide (ITO) or indium zinc oxide (IZO).

The reflection electrode comprises aluminum-neodymium (AlNd) having a high reflectivity, and is deposited uniformly on the transparent electrode 120. The reflection electrode 140 has the same surface profile as the organic insulation layer 130. Accordingly, the reflection efficiency of the reflection electrode 140 may be enhanced.

A gate driver circuit 160 is formed in the peripheral area (PA). The gate driver circuit 160 is connected to an end of the gate line (GL) and supplies a gate driving signal for driving the gate of the TFT 110. The gate driver circuit 160 is electrically connected to the gate line (GL) disposed in the display area (DA) through the wiring 165. The gate driver circuit 160 and the wiring 165 may be formed through the same process in which the TFT 110 is formed in the display area (DA).

The second substrate 200 includes color filters 210 and a common electrode 220. The color filter 210 has red (R), green (G) and blue (B) color filters to display predetermined colors in combination of the red (R), green (G) and blue (B) colors. The common electrode 220 is deposited uniformly on the color filter 210 and faces the transparent electrode 120 and the reflection electrode 140.

The second substrate 200 is engaged with the first substrate 100 by sealant 350. The sealant 350 is disposed in the peripheral area (PA) and covers the second portion (A2) of the gate driver circuit 160 except the first portion (A1) of the gate driver circuit 160.

The liquid crystal layer 300 is interposed between the first and second substrates 100 and 200 that are engaged each other by the sealant 350, to thereby complete the LCD device 400.

The gate driver circuit 160 is covered by the sealant 350 having a dielectric constant lower than that of the liquid crystal layer 300. Since the capacitance is in proportional to the dielectric constant and the sealant 350 is interposed between the gate driver circuit 160 and the common electrode 220, the capacitance between the gate driver circuit 160 and the common electrode 220 may be reduced.

The above structure in which the sealant 350 and the gate driver circuit 160 are arranged may be employed in the transmissive type LCD device.

As shown in FIG. 2B, the transmissive type LCD device has the same peripheral area structure as the transmissive and reflective type LCD device of FIG. 2A. Although the above preferred embodiment shows the configuration according to the transmissive type LCD device shown in FIG. 2B, any other configurations known to one of the ordinary skill in the art may also be utilized in place of the configuration according to the transmissive type LCD device of FIG. 2B.

Figure 3:
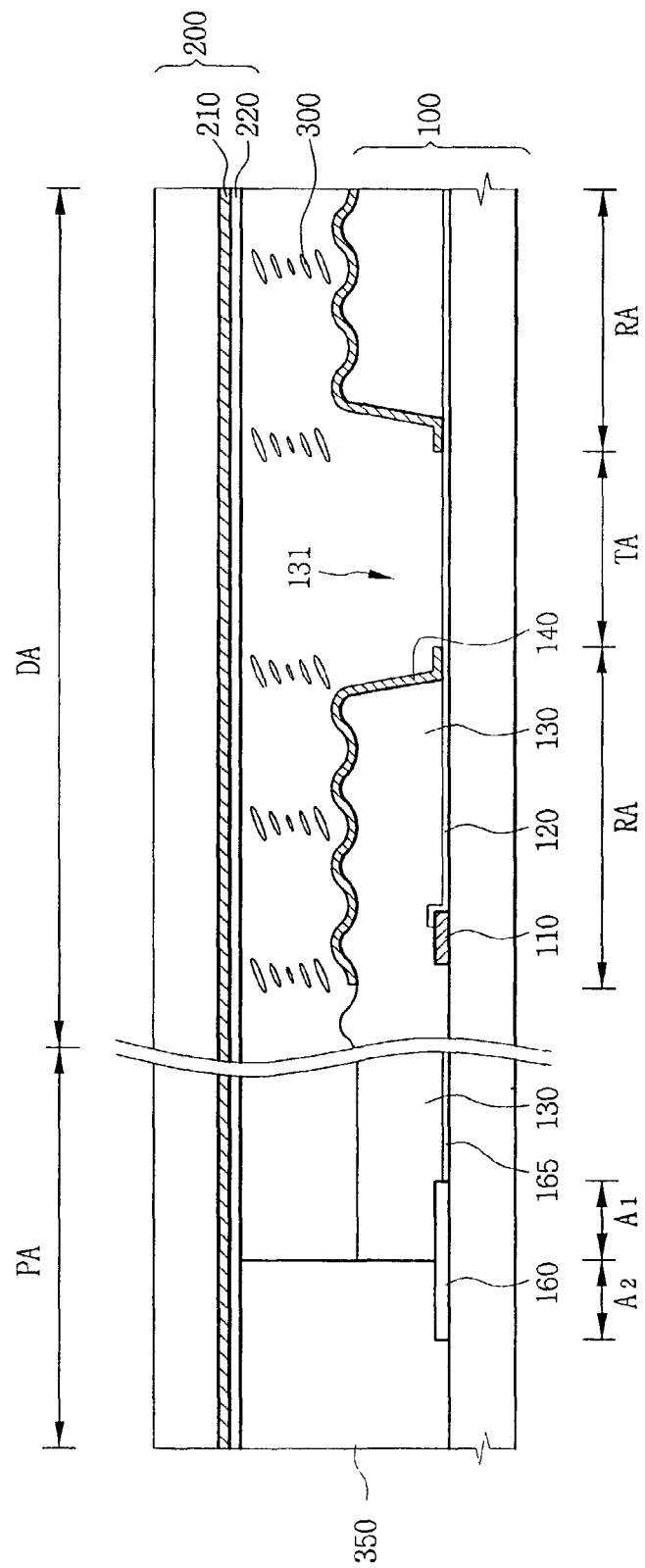
FIG. 3 is a cross-sectional view showing a liquid crystal display device according to a third exemplary embodiment of the present invention.

FIG. 3 is a cross-sectional view showing a liquid crystal display device according to a third exemplary embodiment of the present invention.

Referring to FIG. 3, the first substrate 100 includes a display area (DA) through which an image is displayed and a peripheral area (PA) surrounding the display area (DA). The display area (DA) includes a plurality of TFTs 110 and pixel electrodes connected to the TFTs 110. The pixel electrode 120 includes a transparent electrode 120 and a reflection electrode 140. The transparent electrode 120 is directly connected to the TFT 110, and the reflection electrode 140 is electrically connected to the TFT 110 through the transparent electrode 120. While the TFT 110 is formed on the first substrate 100, the transparent electrode 120 is directly connected to a drain (not shown) of the TFT 110. An organic insulation layer 130 is formed on the first substrate 100 on which the TFT 110 and the transparent electrode 120 are formed. The organic insulation layer 130 covers a contact portion of the TFT 110 in which the TFT 110 is electrically connected to the transparent electrode 120. The organic insulation layer 130 includes an opening 131 through which a portion of the transparent electrode 120 is exposed. The transmissive area (TA) corresponds to the opening 131.

The reflection electrode 140 is formed on the organic insulation layer 130 and is electrically connected to the transparent electrode 120 through the opening 131. In other words, the reflection electrode 140 is extended to a portion of the transparent electrode 120 that is exposed by the opening 131 and contacts with the transparent electrode 120. Accordingly, the reflection electrode 140 is electrically connected to the drain of the TFT 110 through the transparent electrode 120.

A gate driver circuit 160 is formed in the peripheral area (PA). The gate driver circuit 160 is connected to an end of the gate line (GL) and supplies a gate driving signal for driving the gate of the TFT 110. The organic insulation layer 130 covers a first portion (A1) of the gate driver circuit.

The sealant 350 is disposed in the peripheral area (PA) and covers the second and covers the second portion (A2) of the gate driver circuit 160 except the first portion (A1) of the gate driver circuit 160.

The gate driver circuit 160 is covered by the sealant 350 and the organic insulation layer 130. The sealant 350 and the organic insulation layer 130 have dielectric constants lower than that of the liquid crystal layer 300. Since the capacitance is in proportional to the dielectric constant and the sealant 350 and the organic insulation layer 130 are interposed between the gate driver circuit 160 and the common electrode 220, the capacitance between the gate driver circuit 160 and the common electrode 220 may be reduced.

Figure 4:
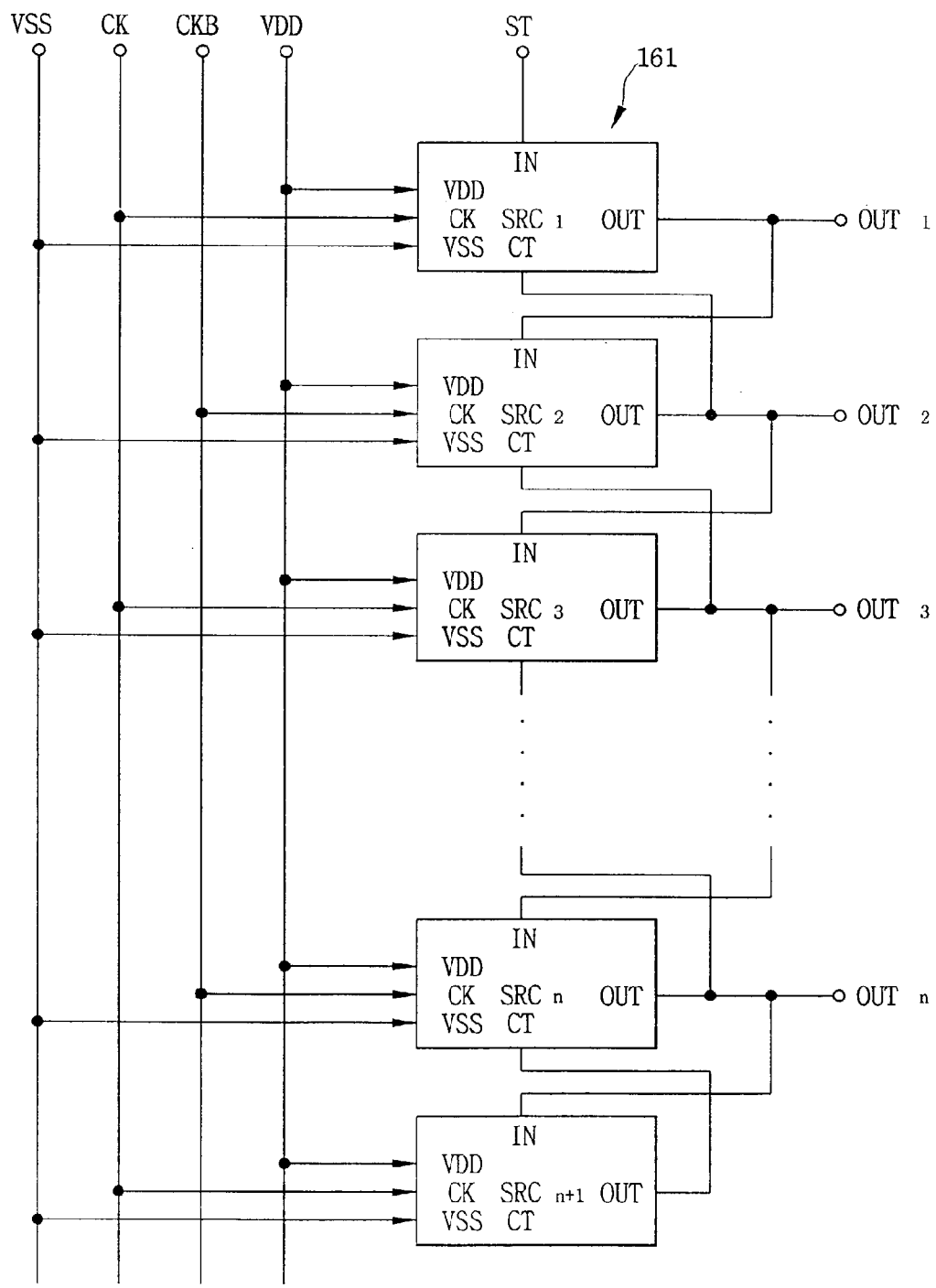
FIG. 4 is a block diagram showing the gate driver circuit of FIG. 3.
Figure 5:
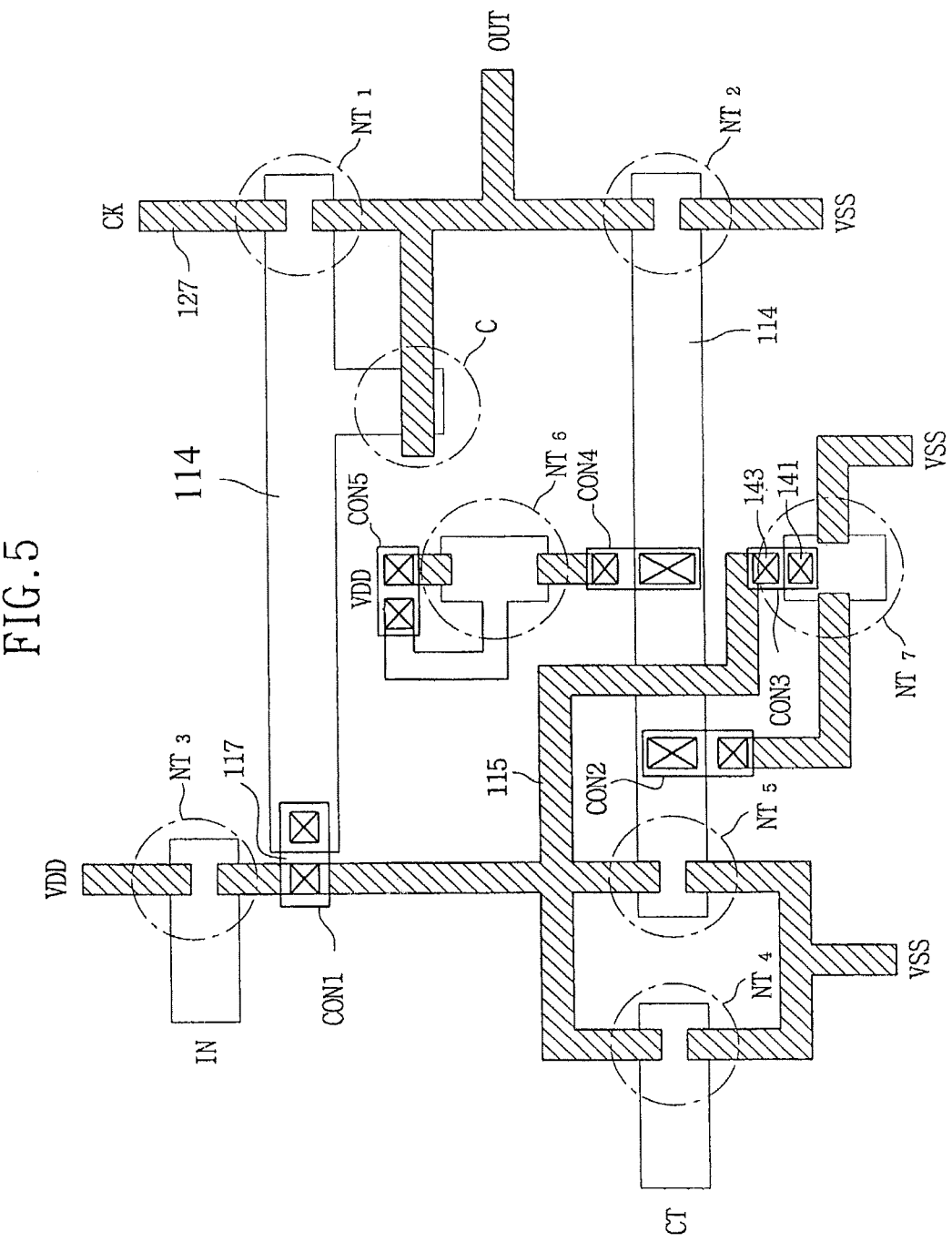
FIG. 5 is a layout showing each of the stage of the gate driver circuit of FIG. 3.

FIG. 4 is a block diagram showing the gate driver circuit of FIG. 3, and FIG. 5 is a layout showing each of the stage of the gate driver circuit of FIG. 3.

Referring to FIG. 4, the gate driver circuit 160 includes a shift register 161. The shift register 161 includes a plurality of stages each of which is cascade-connected.

An output terminal (OUT) of the present stage is connected to the corresponding gate line and is connected to an input terminal (IN) of the next stage and a control terminal (CT) of the previous stage. Each of the stages receives electric power 'VSS' and 'VDD' through power lines, and clock signals 'CK' and 'CKB' through clock lines. Accordingly, each of the stages outputs sequentially a gate driving signal having a high voltage level to the corresponding gate lines.

Each of the stages includes a plurality of NMOS transistors NT1, NT2, NT3, NT4, NT5, NT6, and NT7 and a capacitor (C). Specifically, each of the stages includes a first conduction pattern 114 and a second conduction pattern 115. The first conduction pattern 114 includes a plurality of gate electrodes of the NMOS transistors NT1, NT2, NT3, NT4, NT5, NT6, and NT7 and a first wiring extended from the gate electrodes. The second conduction pattern 115 includes a plurality of source and drain electrodes of the NMOS transistors NT1, NT2, NT3, NT4, NT5, NT6, and NT7 and a second wiring extended from the source and drain electrodes.

The first and second conduction patterns 114 and 115 is insulated each other by a gate insulation layer, similar to the gate insulation layer 109 between gate electrode 111, and source and drain electrodes 112 and 113 (refer to FIG. 14). Since the organic insulation layer 130 is formed on the second conduction pattern 115, each of the stages requires a conduction layer 117 for electrically connecting the first conduction pattern 114 and the second conduction pattern 115.

Each of the stages includes first, second, third, fourth and fifth contact hole regions CON1, CON2, CON3, CON4, and CON5. A gate electrode of the first NMOS transistor NT1 is electrically connected to a source electrode of the third NMOS transistor NT3 by the first contact hole region CON1. A gate electrode of the second NMOS transistor NT2 is electrically connected to a drain electrode of the seventh NMOS transistor NT7 by the second contact hole region CON2. A gate electrode of the seventh NMOS transistor NT7 is electrically connected to a source electrode of the third NMOS transistor NT3 by the third contact hole region CON3. A gate electrode of the second NMOS transistor NT2 is electrically connected to a source electrode of the sixth NMOS transistor NT6 by the fourth contact hole region CON4. A gate electrode of the sixth NMOS transistor NT6 is electrically connected to a drain electrode of the sixth NMOS transistor NT6 by the fifth contact hole region CON5. The conduction layer 117 is formed so as to correspond to the first, second, third, fourth and fifth contact hole regions CON1, CON2, CON3, CON4, and CON5.

Specifically, the gate electrode of the seventh NMOS transistor NT7 is electrically connected to the source electrode of the third NMOS transistor NT3 through the third contact hole region CON3. An organic insulation layer 130 has a first contact hole 141 and a second contact hole 143. The first contact hole 141 is formed on a portion of the organic insulation layer 130 corresponding to the source electrode of the third NMOS transistor NT3. The first contact hole 141 exposes the gate electrode of the seventh NMOS transistor NT7. The second contact hole 143 is formed on another portion of the organic insulation layer 130 corresponding to the drain electrode of the seventh NMOS transistor NT7. The second contact hole 143 exposes the source electrode of the third NMOS transistor NT3. The conduction layer 117 is connected to the gate electrode of the seventh NMOS transistor NT7 and the source electrode of the third NMOS transistor NT3 through the first and second contact holes 141 and 143. Accordingly, the conduction layer 117 electrically connects the gate electrode of the seventh NMOS transistor NT7 and the source electrode of the third NMOS transistor NT3. For example, the conduction layer 117 comprises a transparent conducting material such as indium tin oxide (ITO).

Although each of the stages of FIG. 5 shows the configuration including NMOS transistors NT1, NT2, NT3, NT4, NT5, NT6, and NT7, each of the stages may include various configurations in place of the configuration of FIG. 5. Although each of the stages has other configurations in place of the configuration of FIG. 5, each of the stages has the conduction layer 117.

Figure 6:
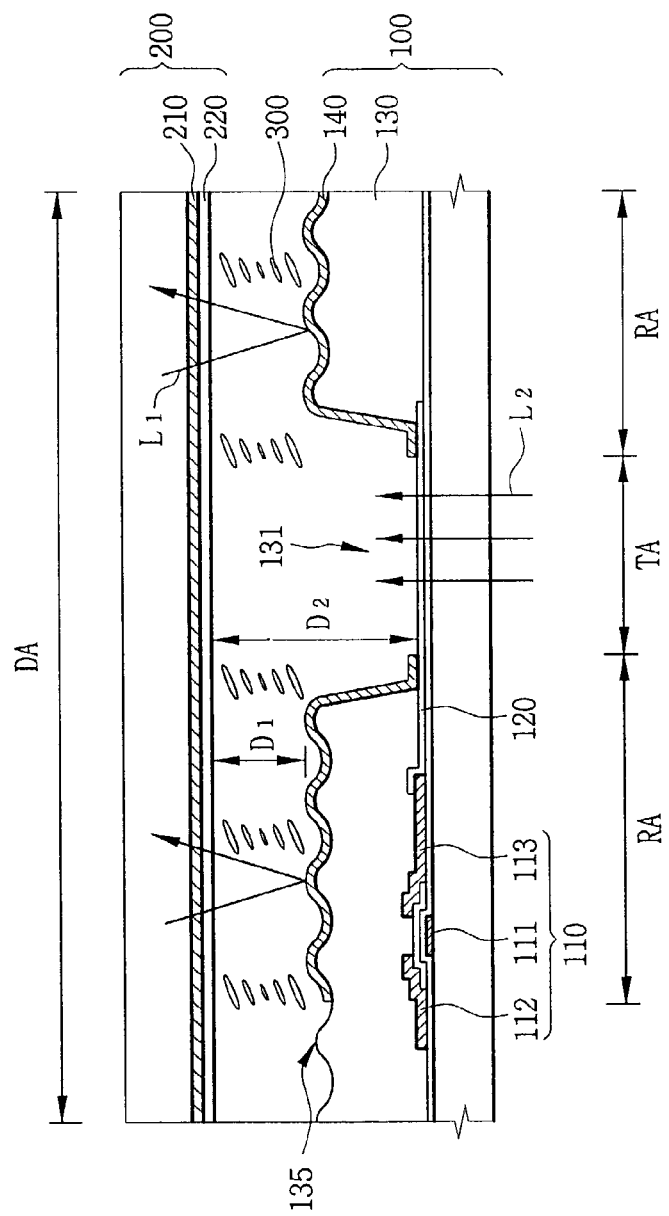
FIG. 6 is a cross-sectional view showing a liquid crystal display device according to a fourth exemplary embodiment of the present invention.
Figure 7:
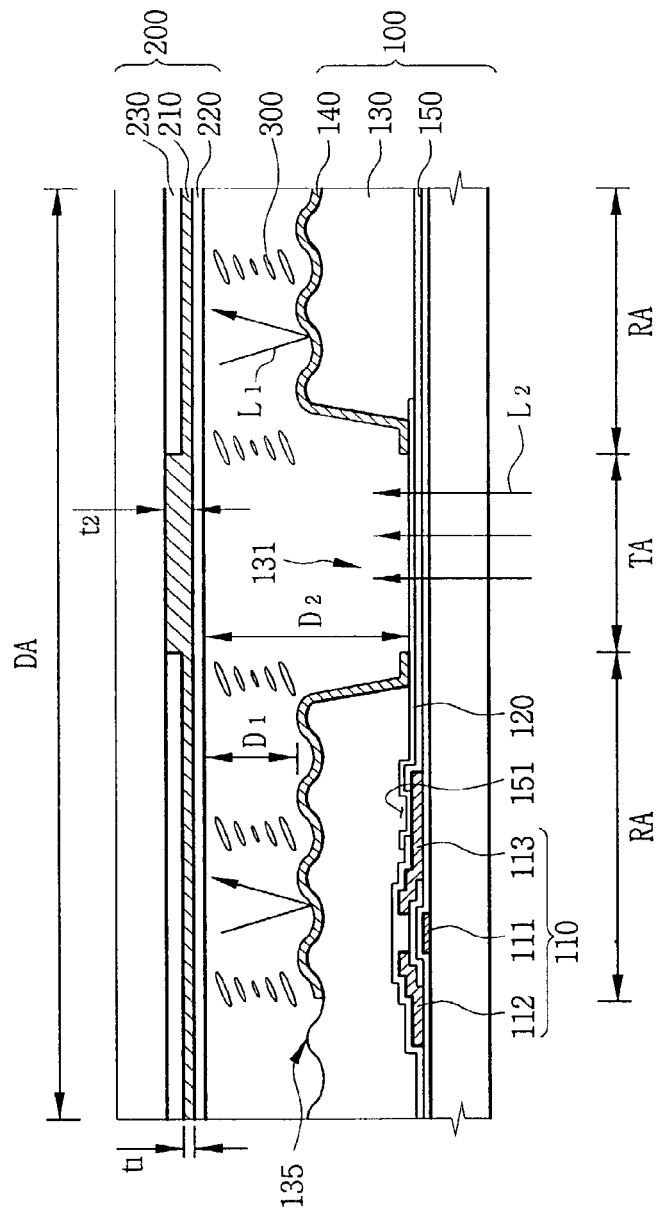
FIG. 7 is a cross-sectional view showing a liquid crystal display device according to a fifth exemplary embodiment of the present invention.

FIG. 6 is a cross-sectional view showing a liquid crystal display device according to a fourth exemplary embodiment of the present invention, and FIG. 7 is a cross-sectional view showing a liquid crystal display device according to a fifth exemplary embodiment of the present invention.

Referring to FIG. 6, in the display area (DA), the first substrate 100 includes a TFT 110 and a pixel electrode, and the second substrate 200 includes a color filter 210 and a common electrode 220. The pixel electrode includes a reflection electrode 140 and a transparent electrode 120 and is connected to the TFT 110.

Specifically, the first substrate 100 includes the TFT 110 having gate electrode 111, source electrode 112 and drain electrode 113. The transparent electrode 120 is formed on the first substrate 100 on which the TFT 110 is formed. The transparent electrode 120 comprises ITO. The transparent electrode 120 is electrically connected to the drain electrode 113. The transparent electrode 120 receives a signal that is applied to the drain electrode of the TFT 110.

An organic insulation layer 130 is formed by a predetermined thickness on the first substrate 100 on which the TFT 110 and the transparent electrode 120. For example, the organic insulation layer 130 comprises a photosensitive resin. The organic insulation layer 130 covers a contact portion of the drain electrode in which the drain electrode contacts with the transparent electrode 120. An opening 131 is formed on a first portion of the organic insulation layer 130 for exposing a portion of the transparent electrode 120. The first portion of the organic insulation layer 130 does not correspond to the contact portion of the drain electrode in which the drain electrode contacts with the transparent electrode 120. Accordingly, the reflectivity of the reflection electrode 140 may be enhanced.

The reflection electrode 140 is formed uniformly on the organic insulation layer 130. For example, the reflection electrode 140 comprises aluminum-neodymium (AlNd). The reflection electrode 140 is electrically connected to the transparent electrode 120 through the opening 131. Accordingly, the reflection electrode 140 receives the signal applied to the drain electrode 113 of the TFT 110 through the transparent electrode 120.

A reflective area (RA) is referred to as an area by which the first light (L1) incident from the front surface of the LCD device 400 is reflected. A transmissive area (TA) is an area in which the transparent electrode 120 is exposed. The transmissive area (TA) is referred to as an area through which the second light (L2) incident from the rear surface of the LCD device 400 is transmitted.

Since the opening 131 is formed on the organic insulation layer 130, the reflective area (RA) of the LCD device 400 has a first cell gap (D1) and the transmissive area (TA) of the LCD device 400 has a second cell gap (D2). In other words, the LCD device has the structure in which the cell gap of the reflective area (RA) is different from that of the transmissive area (TA).

The liquid crystal layer 300 includes a first liquid crystal (not shown) adjacent to the second substrate 200 and a second liquid crystal (not shown) adjacent to the first substrate 100. A twist angle of the first and second liquid crystal is referred to as the angle formed between the major axis of the first and second liquid crystals and the a reference line parallel to the first substrate.

The larger the twist angle is, the smaller has the transmissivity of the LCD device 400. Therefore, the second cell gap (D2) of the transmissive area (TA) is double the first cell gap (D1) of the reflective area (RA) so as to compensate the difference of the light loss due to the polarization characteristics of the LCD device. In the transmissive area (TA), the liquid crystal has a homogeneous alignment (or parallel alignment) so as to increase the transmissivity of the transmissive area (TA). In other words, the twist angle of the liquid crystal in the transmissive area (TA) is substantially 0°.

As shown in FIG. 7, in display area (DA) of the LCD device according to a fifth exemplary embodiment of the present invention, the first substrate 100 includes a TFT 110, a pixel electrode having a transparent electrode 120 and a reflection electrode 140, an inorganic insulation layer 150 and an organic insulation layer 130.

Specifically, the first substrate 100 includes the TFT 110 having gate electrode 111, source electrode 112 and drain electrode 113. The inorganic insulation layer 150 is formed on the first substrate 100 on which the TFT 110 is formed so as to protect the TFT 110. For example, the inorganic insulation layer 150 comprises a transparent inorganic material such as silicon nitride (SiNx) or chrome oxide ($Cr_2O_3$). The inorganic insulation layer 150 has a contact hole 151 for exposing the drain electrode 113 of the TFT 110.

The transparent electrode 120 is formed on the inorganic insulation layer 150. The transparent electrode 120 is electrically connected to the drain electrode 113 through the contact hole 151. The transparent electrode 120 receives a signal applied to the drain electrode 113 of the TFT 110.

The organic insulation layer 130 is formed by a predetermined thickness on the first substrate 100 on which the TFT 110, inorganic insulation layer 150 and the transparent electrode 120. For example, the organic insulation layer 130 comprises a photosensitive acryl resin. An opening 131 is formed on a first portion of the organic insulation layer 130 to expose a portion of the transparent electrode 120. The first portion of the organic insulation layer 130 does not correspond to the contact portion of the TFT 110 in which the TFT 110 contacts with the transparent electrode 120. Accordingly, the reflectivity of the reflection electrode 140 may be enhanced. An embossing pattern having a plurality of convex portions and concave portions is formed on the surface of the organic insulation layer 130 so as to enhance the reflection efficiency of the reflection electrode 140.

The reflection electrode 140 is formed uniformly on the organic insulation layer 130. For example, the reflection electrode 140 comprises aluminum-neodymium (AlNd). The reflection electrode 140 is electrically connected to the transparent electrode 120 through the opening 131. Accordingly, the reflection electrode 140 receives the signal applied to the drain electrode 113 of the TFT 110 through the transparent electrode 120.

Another contact hole for electrically connecting the reflection electrode 140 with the transparent electrode 120 and the drain electrode 113 is not required since the reflection electrode 140 is electrically connected to the exposed transparent electrode 120 through the opening 131. Therefore, the reflection efficiency of the reflection electrode 140 may be enhanced. The reflection electrode 140 is formed on the upper surface and the sidewall of the organic insulation layer 130 and also is extended onto the upper surface of the transparent electrode 120 so as to enhance the reflective efficiency of the reflection electrode.

A reflective area (RA) is referred to as an area by which the first light (L1) incident from the front surface of the LCD device 400 is reflected. A transmissive area (TA) is an area in which the transparent electrode 120 is exposed. The transmissive area (TA) is referred to as an area through which the second light (L2) incident from the rear surface of the LCD device 400 is transmitted.

The second substrate 200 includes a thickness-regulating member 230, a color filter 210 and a common electrode 220 facing the transparent electrode 120 and the reflection electrode 140. The color filter formed on the second substrate 200 has a first thickness (t1) in the reflection area (RA), and has a second thickness (t2) thicker than the first thickness (t1). For example, the second thickness (t2) is twice the first thickness (t1).

The thickness-regulating member 230 is formed on a remained portion of the entire surface of the second substrate 200 except the portion of the entire surface of the second substrate 200 corresponding to the transmissive area (TA). The thickness-regulating member 230 has a first thickness (t1). The color filter 210 is formed on the second substrate 200 on which the thickness-regulating member 230 is formed. The color filter may have a uniform surface. Accordingly, the color filter formed in the reflection area (RA) has a first thickness (t1) and has a second thickness (t2) in the transmissive area (TA). The common electrode 220 having a uniform thickness is formed on the color filter 210.

The first light (L1) is incident into the reflection area (RA) and is reflected by the reflection electrode 140. The first light (L1) transmits twice the color filter 210 having the second thickness (t2) and exits from the color filter 210. The second light (L2) transmit the transmissive area (TA) and transmits one time the color filter 210 having the second thickness (t2) and exits from the color filter 210. Therefore, the color reproduction in the reflection area (RA) is substantially the same as the color reproduction in the transmissive area (TA).

Figure 8:
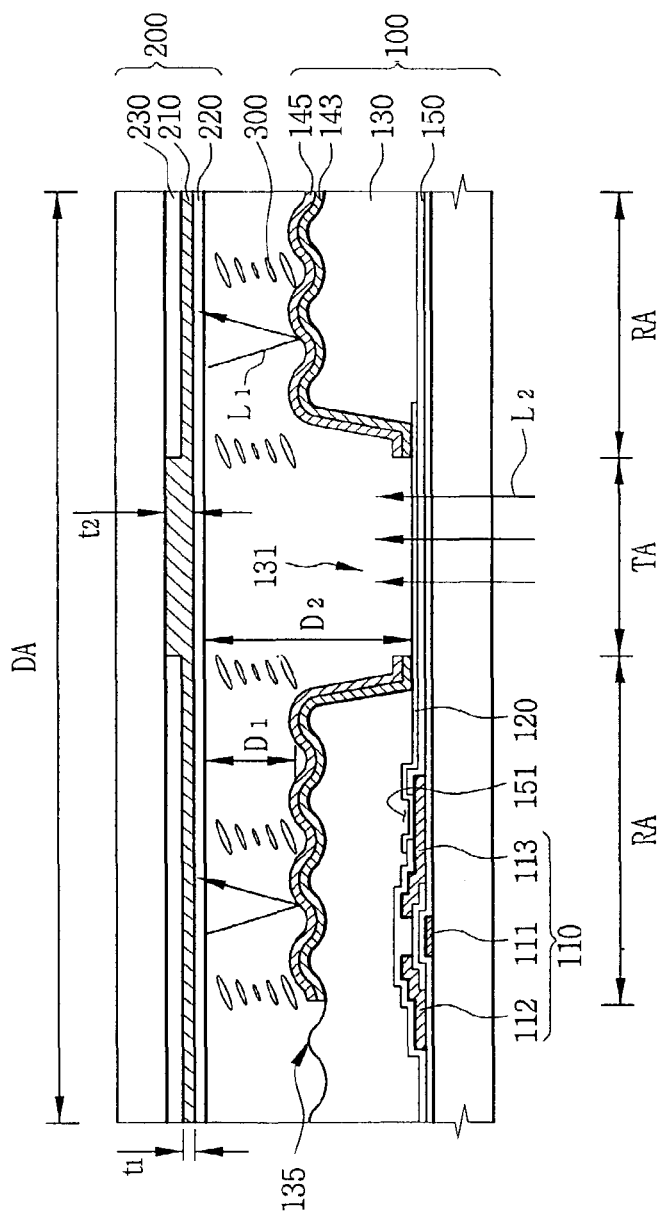
FIG. 8 is a cross-sectional view showing a liquid crystal display device according to a sixth exemplary embodiment of the present invention.

FIG. 8 is a cross-sectional view showing a liquid crystal display device according to a sixth exemplary embodiment of the present invention.

Referring to FIG. 8, the first substrate 100 includes the TFT 110 having gate electrode 111, source electrode 112 and drain electrode 113. A transparent electrode 120 comprised of indium tin oxide (ITO) is formed on the first substrate 100 on which the TFT 110 is formed. The transparent electrode is electrically connected to the drain electrode 113. The transparent electrode 120 receives the signal applied to the drain electrode 113 of the TFT 110.

The organic insulation layer 130 is formed by a predetermined thickness on the first substrate 100 on which the transparent electrode 120 is formed. For example, the organic insulation layer 130 comprises a photosensitive acryl resin. The organic insulation layer 130 covers the contact portion of drain electrode 113 of the TFT 110 in which drain electrode 113 of the TFT 110 makes contact with the transparent electrode 120. An opening 131 is formed on a first portion of the organic insulation layer 130 to expose a portion of the transparent electrode 120. The first portion of the organic insulation layer 130 does not correspond to the contact portion of the TFT 110 in which the TFT 110 makes contact with the transparent electrode 120.

A first reflection electrode 143 and a second reflection electrode 145 are formed in the order named on the organic insulation layer 130. The first reflection electrode 143 comprises molybdenum-tungsten (MoW). The second reflection electrode 145 comprises aluminum-neodymium (AlNd). The first reflection electrode 143 is electrically connected to the transparent electrode 120 through the opening 131. The first reflection electrode 143 and second reflection electrode 145 receives the signal applied to the drain electrode 113 of the TFT 110 through the transparent electrode 120.

As shown in FIG. 8, the first reflection electrode 143 is interposed between the second reflection electrode 145 and the transparent electrode 120 in the area where the opening 131 is formed. Accordingly, the electric cell reaction generated between the second reflection electrode 145 and the transparent electrode 143 may be prevented.

Figure 9:
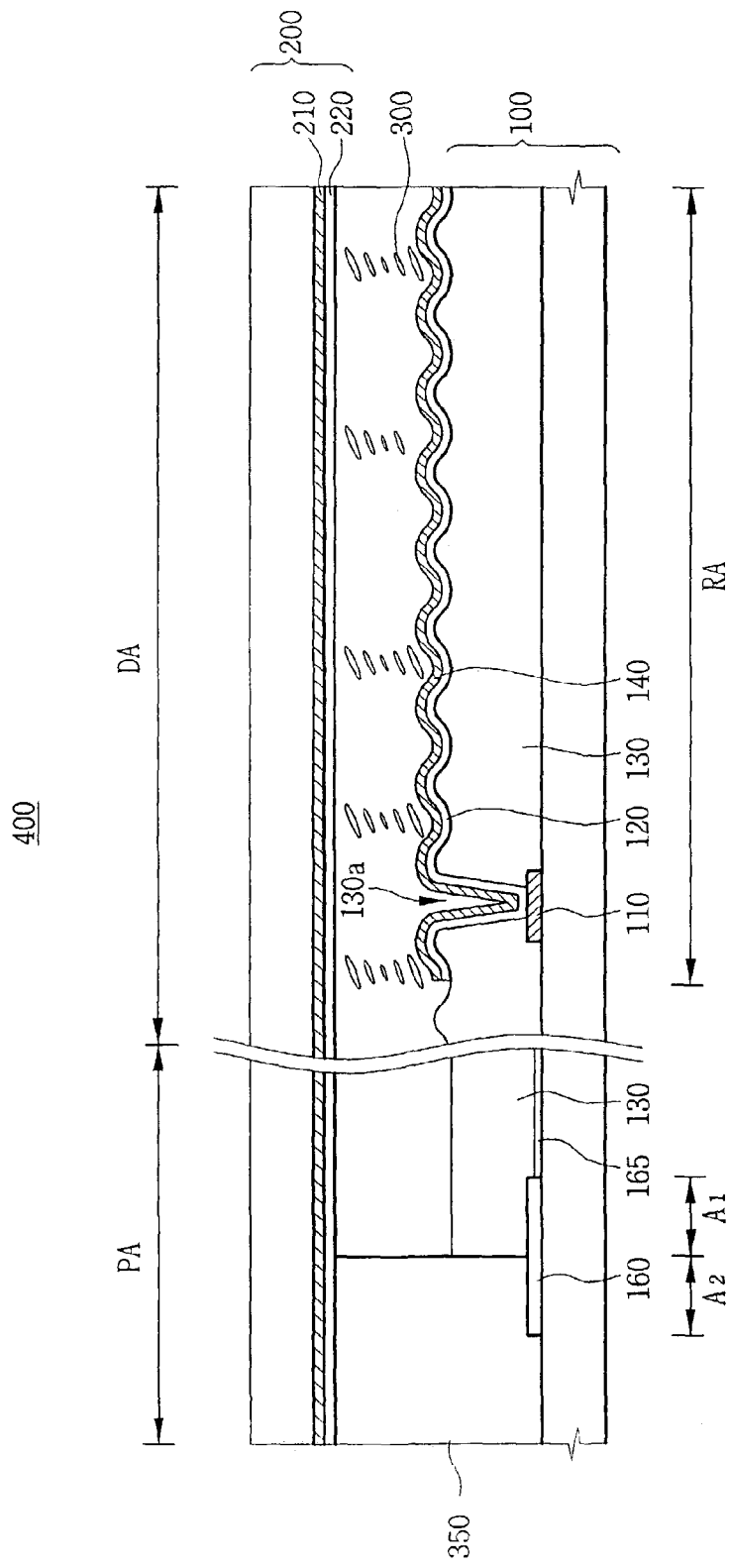
FIG. 9 is a cross-sectional view showing a liquid crystal display device according to a seventh exemplary embodiment of the present invention.

FIG. 9 is a cross-sectional view showing a liquid crystal display device according to a seventh exemplary embodiment of the present invention. FIG. 8 represents the reflective type LCD device, and is different from the first exemplary embodiment in that the display area (DA) has a reflection area (RA) and does not has a transmissive area (TA).

Referring to FIG. 9, the light supplied from the external light source is reflected by the reflection electrode 140 in the reflection area (RA).

A sealant 350 has a dielectric constant lower than that of the liquid crystal layer 300 and covers the gate driver circuit 160. Since the sealant 350 is interposed between the gate driver circuit 160 and the common electrode 220, a parasite capacitance between the gate driver circuit 160 and the common electrode 220 may be reduced.

Figure 10:
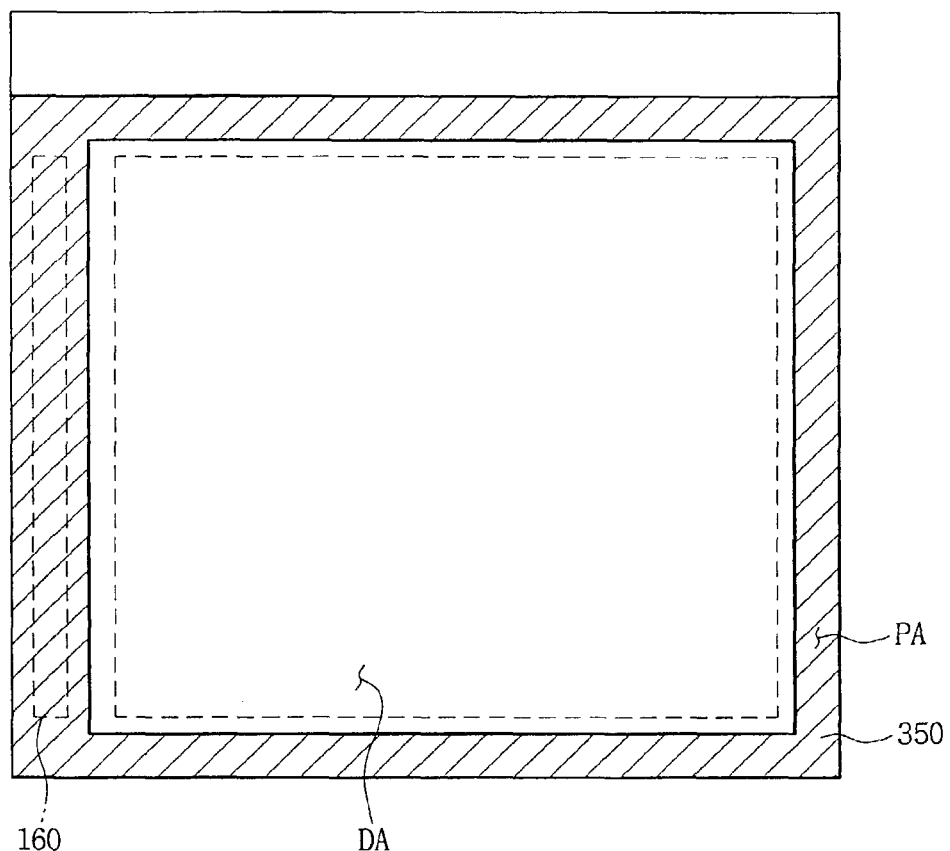
FIG. 10 is a plan view showing another example of a liquid crystal display device of the present invention.
Figure 11B:
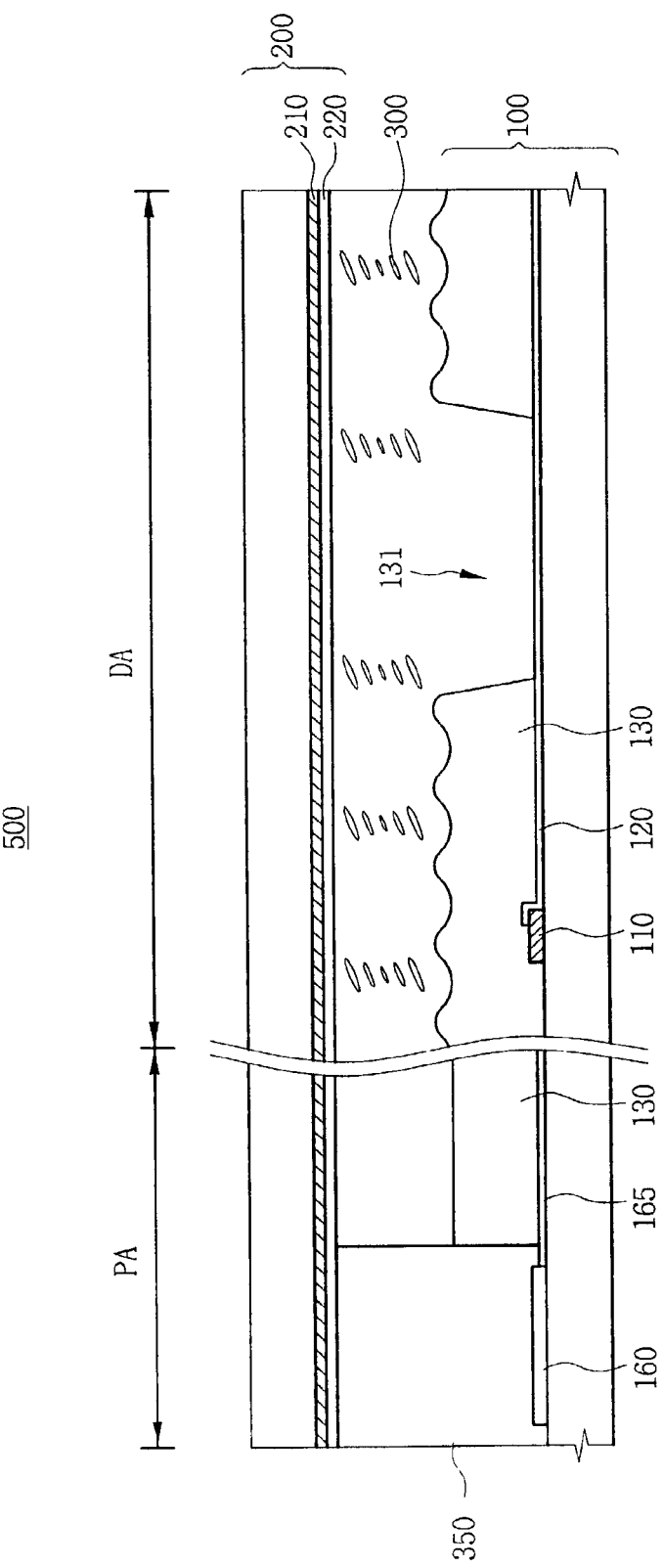
FIG. 11B is cross-sectional view showing a transmissive type liquid crystal display device according to a ninth exemplary embodiment of the present invention.

FIG. 10 is a plan view showing another example of a liquid crystal display device of the present invention. FIG. 11A is cross-sectional view showing a transmissive and reflective type liquid crystal display device according to an eighth exemplary embodiment of the present invention, and FIG. 11B is cross-sectional view showing a transmissive type liquid crystal display device according to a ninth exemplary embodiment of the present invention. Throughout FIGS. 10, 11A and 11B, the same elements are designated by the same reference numerals of FIGS. 1 and 3, and detailed descriptions about the identical elements are omitted.

Referring FIGS. 10 and 11A, the LCD device 500 includes a display area (DA) through which an image is displayed and a peripheral area (PA) surrounding the display area (DA).

A gate driver circuit 160 is formed in the peripheral area (PA). The gate driver circuit 160 is connected to an end of the gate line (GL) and supplies a gate driving signal for driving the gate of the TFT 110. The gate driver circuit 160 is electrically connected to the gate line (GL) disposed in the display area (DA) through the wiring 165. The gate driver circuit 160 and the wiring 165 may be formed through the same process in which the TFT 110 is formed in the display area (DA).

The second substrate 200 is engaged with the first substrate 100 by sealant 350. The sealant 350 is disposed in the peripheral area (PA) and covers entire surface of the gate driver circuit 160.

The liquid crystal layer 300 is interposed between the first and second substrates 100 and 200 that are engaged with each other by the sealant 350, to thereby complete the LCD device 500.

The sealant 350 has a dielectric constant lower than those of the liquid crystal layer 300 and the organic insulation layer 130 formed on the display area (DA) and the peripheral area (PA). The capacitance is in proportional to the dielectric constant, and the sealant 350 having a dielectric constant lower than those of the liquid crystal layer 300 and the organic insulation layer 130 is interposed between the gate driver circuit 160 and the common electrode 220. The entire surface of the gate driver circuit 160 is covered by the sealant 350, so that the parasite capacitance between the gate driver circuit 160 and the common electrode 220 may be reduced.

The above structure in which the sealant 350 and the gate driver circuit 160 are arranged may be employed not only in the transmissive type LCD device but also in the reflective type LCD device (not shown) or in the transmissive type LCD device (refer to FIG. 11B). Although FIG. 11B shows the configuration of the transmissive type LCD device, any other configurations known to one of the ordinary skill in the art may also be utilized in place of the configuration according to the transmissive type LCD device of FIG. 11B.

Figure 12:
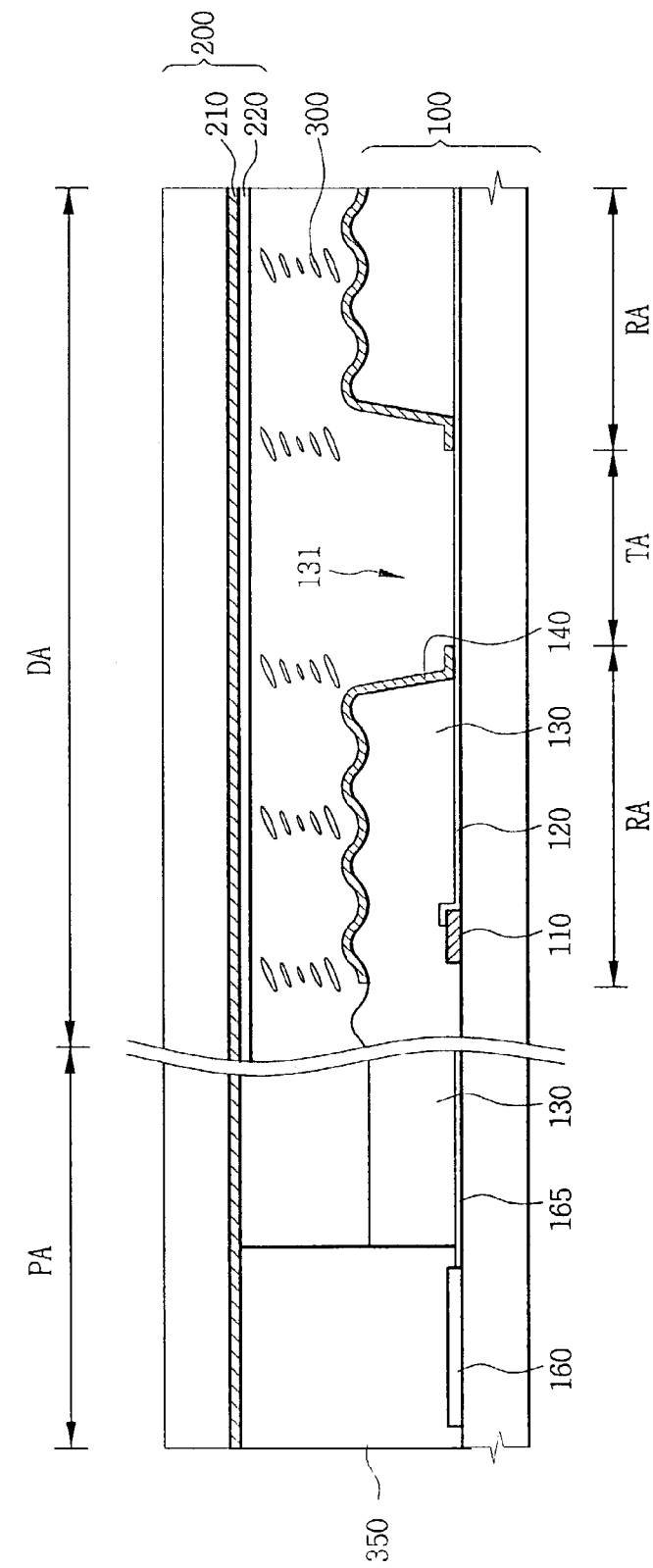
FIG. 12 is a cross-sectional view showing a liquid crystal display device according to a tenth exemplary embodiment of the present invention.

FIG. 12 is a cross-sectional view showing a liquid crystal display device according to a tenth exemplary embodiment of the present invention.

Referring to FIG. 12, the LCD device according to the tenth exemplary embodiment of the present invention has the structure in which the common electrode is removed on a portion of the second substrate 200. The portion of the second substrate 200 is disposed over the gate driver circuit 160 and the wiring 165. The common electrode 220 may be formed in a display area (DA) except the peripheral area (PA). In addition, the common electrode 220 may be further formed in the peripheral area (PA) in which the sealant 350 exists.

The portion of the common electrode 220 disposed over the gate driver circuit 160 and the wiring 165 is etched away by a photolithography process. Accordingly, the parasite capacitance generated in the peripheral area (PA) may be prevented.

In addition, the sealant and insulation layer having a dielectric constant lower than that of the liquid crystal layer 300 covers the gate driver circuit 160, and the insulation layer having a dielectric constant lower than that of the liquid crystal layer 300 covers the wiring 165. In addition, the portion of the common electrode disposed over the gate driver circuit 160 is removed.

The parasite capacitance between the gate driver circuit and the common electrode may be reduced. Therefore, the gate driver circuit may operate normally, and the distortion of the signal outputted from the gate driver circuit may be prevented.

The structure of the common electrode in FIG. 12 may be employed not only in the transmissive and reflective type LCD device, but also in a reflective type LCD (not shown) device or in a transmissive type LCD device.

Figure 13:
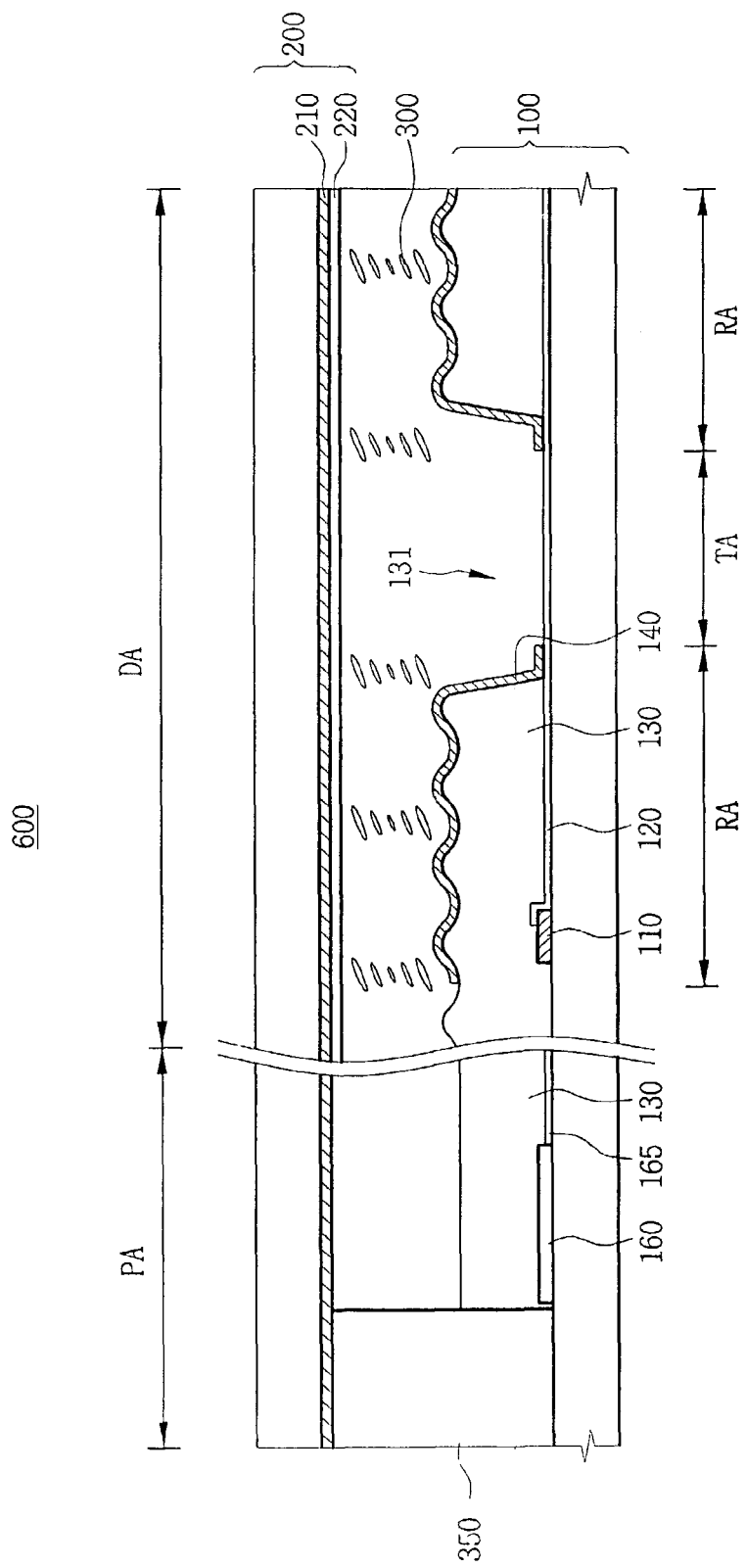
FIG. 13 is a cross-sectional view showing a liquid crystal display device according to an eleventh exemplary embodiment of the present invention.

FIG. 13 is a cross-sectional view showing a liquid crystal display device according to an eleventh exemplary embodiment of the present invention.

Referring to FIG. 13, the liquid crystal display device includes a first substrate 100, a second substrate 200 facing the first substrate 100 and a liquid crystal layer 300 interposed between the first and second substrate 100 and 200. The LCD device includes a display area (DA) through which an image is displayed and a peripheral area (PA) surrounding the display area (DA).

The display area (DA) includes a plurality of pixels arranged in a matrix shape. Each of the pixels includes a thin film transistor (TFT) 110 and a pixel electrode connected to the TFT 110. The TFT 110 is connected to a gate line (GL) and a data line (DL). The data line (DL) is extended in a first direction, and the gate line (GL) is extended in a second direction substantially perpendicular to the first direction. The pixel electrode includes a transparent electrode 120 and a reflection electrode 140. The transparent electrode 120 is directly connected to the TFT 110, and the reflection electrode 140 is electrically connected to TFT 110 through the transparent electrode 120.

An organic insulation layer 130 is formed on the first substrate 100 on which the TFT 110 and the transparent electrode 120 are formed. The organic insulation layer 130 covers a contact portion of the TFT 110 in which the TFT 110 is electrically connected to the transparent electrode 120. The organic insulation layer 130 includes an opening 131 through which a portion of the transparent electrode 120 is exposed. The transmissive area (TA) corresponds to the opening 131.

The reflection electrode 140 is formed on the organic insulation layer 130 and is electrically connected to the transparent electrode 120 through the opening 131. In other words, the reflection electrode 140 is extended to a portion of the transparent electrode 120 that is exposed by the opening 131 and makes contact with the transparent electrode 120. Accordingly, the reflection electrode 140 is electrically connected to the drain of the TFT 110 through the transparent electrode 120.

A gate driver circuit 160 is formed in the peripheral area (PA). The gate driver circuit 160 is connected to an end of the gate line (GL) and supplies a gate driving signal for driving the gate of the TFT 110. The gate driver circuit 160 is electrically connected to the gate line (GL) disposed in the display area (DA) through the wiring 165. The gate driver circuit 160 and the wiring 165 may be formed through the same process in which the TFT 110 is formed in the display area (DA). The organic insulation layer 160 having a dielectric constant lower than that of the liquid crystal layer 300 covers the entire surface of the gate driver circuit 160.

The second substrate 200 includes color filters 210 and a common electrode 220. The common electrode 220 is deposited uniformly on the color filter 210. The common electrode 220 is formed only in the display area (DA) and is not formed in the peripheral area (PA). However, the common electrode 220 may be further formed in the peripheral area (PA) where the sealant 350 exists.

The portion of the common electrode 220 disposed over the gate driver circuit 160 is etched away by the photolithography process. Accordingly, the parasite capacitance generated in the peripheral area (PA) may be prevented.

FIG. 14 is a cross-sectional view showing a liquid crystal display device according to a twelfth exemplary embodiment of the present invention.

Referring to FIG. 14, in the display area (DA), the first substrate 100 includes TFT 110, pixel electrode, inorganic insulation layer 150 and organic insulation layer 130. The pixel electrode includes a transparent electrode 120 and a reflection electrode 130. In the display area (DA), the LCD device has the same structure as that of the LCD device of FIG. 7. The first substrate 100 includes a second insulation layer. The second insulation layer electrically connects the TFT 110 and the transparent electrode 120.

The structure of the common electrode of FIGS. 11A and 11B may be employed not only in the LCD device having the same structure of the display area (DA) shown in FIGS. 11A and 11B but also the LCD device having the same structure of the display area (DA) shown in FIGS. 2, 6 and 8. In addition, the structure of the common electrode of FIGS. 11A and 11B may be employed not only in the transmissive and the reflective type LCD device but also may be employed in a reflective type LCD device or a transmissive type LCD device.

While the exemplary embodiments of the present invention and its advantages have been described in detail, it should be understood that various changes, substitutions and alterations can be made herein without departing from the scope of the invention as defined by appended claims.

What is claimed is:

1. A liquid crystal display device comprising:
   a first substrate including a display part for displaying an image and a driver part for driving the display part;
   a second substrate facing the first substrate, and having a common electrode which is not overlapped with the driver part;
   a sealing member disposed between the first and second substrates to engage the first substrate with the second substrate such that the driver part is between the sealing member and the display part; and
   a liquid crystal layer disposed between the first and second substrates,
   wherein the driver part comprises:
      a plurality of thin film transistors,
      a first conduction pattern on the first substrate, wherein a first end of the first conduction pattern comprises a gate electrode of a first thin film transistor;
      a second conduction pattern insulated from the first conduction pattern and disposed on the first conduction pattern, wherein the second conduction pattern comprises a source electrode of a second thin film transistor;
      a conduction layer which contacts a second end of the first conduction pattern, and electrically connects the first and second conduction patterns with each other;
      an insulation layer between the second conduction pattern and the conduction layer.

2. The liquid crystal display device of claim 1, wherein the display part comprises a pixel electrode, and a switching element electrically connected to the pixel electrode.

3. The liquid crystal display device of claim 2, wherein the driver part comprises a shift register applying a signal to the switching element.

4. The liquid crystal display device of claim 2, wherein the insulation layer covers the switching element and at least a portion of the pixel electrode.

5. The liquid crystal display device of claim 4, wherein the pixel electrode includes a transparent electrode, and the insulation layer has an opening exposing the transparent electrode.

6. The liquid crystal display device of claim 5, wherein the pixel electrode further comprises a reflection electrode disposed on the insulation layer.

7. The liquid crystal display device of claim 6, wherein the reflection electrode is connected to the transparent electrode through the opening of the insulation layer.

8. The liquid crystal display device of claim 1, wherein the driver part comprises a plurality of stages, which are cascade-connected.

9. The liquid crystal display device of claim 8, wherein an output terminal of a present stage is connected to an input terminal of a next stage and a control terminal of a previous stage.

10. The liquid crystal display device of claim 1, wherein the insulation layer extends to cover the display part.

* * * * *